Patented Mar. 22, 1927.

1,621,757

UNITED STATES PATENT OFFICE.

PAUL SEYDEL, OF NITRO, WEST VIRGINIA, ASSIGNOR TO THE SEYDEL CHEMICAL CO., A CORPORATION OF WEST VIRGINIA.

ANTISPASMODIC.

No Drawing. Application filed May 14, 1923. Serial No. 638,978.

This invention relates to compositions of matter having anti-spasmodic properties, that is to say, to materials which have the property of diminishing or overcoming spasmodic activity in non-striated muscles in the animal organism. The principal object of the invention is to provide an anti-spasmodic composition which has more desirable properties than similar products hitherto known.

In one of its forms the present invention comprises the sodium salt of a mono-benzyl derivative or ester of a dibasic organic acid characterized by its vigorous anti-spasmodic power and its ready solubility in water and also by its pleasant slightly salty taste and by its purity or freedom from relatively insoluble or oily benzyl derivatives having an unpleasant taste and nauseating effect when taken into the stomach.

The improved product of the present invention finds important applications in the treatment of various abnormal conditions of the animal organism, including: pyloric spasm (nervous indigestion); colics (gastric, intestinal, uterine, biliary, renal, etc.); asthma (true asthma in which spasm of the bronchioles exists); hiccough; dysmenorrhea; whooping cough; spasms (all kinds, either functional or reflex, including spastic constipation); high blood pressure and angina pectoris; sea-sickness and car-sickness. Also because of the fact that the improved product lowers the "tonus effect" of smooth or non-striated muscles it is frequently useful in the treatment or control of excessive peristalsis of diarrhea and dysentery.

Among the more important advantageous properties of the improved product in addition to its extraordinarily vigorous antispasmodic power over non-striated muscles, are its remarkable freedom from toxicity and habit forming tendencies.

I am aware that hitherto the medicinals employed for the foregoing purposes have usually consisted of products containing benzyl derivatives (since it is well-known that the benzyl group imparts anti-spasmodic properties to the compounds in which it occurs) but as previously indicated these older products possess disadvantages which render their use objectionable under many circumstances. Among the most objectionable of these characteristics are their pronounced toxicity and habit forming power and this is particularly true of certain of the benzyl-containing alkaloids of opium (e. g. papaverin).

Other benzyl derivatives such as benzyl benzoate while not habit forming as are opium alkaloids, are objectionable in actual practice either because of their bad taste, their nauseating effect, their insolubility or their relatively low anti-spasmodic power.

The product of the present invention does not possess any of the foregoing disadvantages in any objectionable degree and moreover it may be readily and conveniently prepared according to new and improved methods of manufacture which likewise form an important part of my invention.

Other advantages and objects of my invention will appear from a more detailed description of my improved product and method of making the same as set forth in the following examples.

*Example 1.*—118 pounds of succinic acid (melting point 185° C.) and 108 pounds of benzyl alcohol are heated together in an aluminum still. The temperature is gradually raised until the water starts to distil over, and then is gradually increased to 165° C. and kept at about this temperature for three hours. This operation takes from 6 to 8 hours. About 18 pounds of water and 1 pound of benzyl alcohol distil over and may be recovered.

The esterification mass remaining in the still is cooled to 100° C. and poured into about 60 gallons of hot water and stirred for about 15 minutes. The mass is then allowed to settle and the clear solution siphoned off. This operation is repeated twice more making three such extractions with hot water. A fourth treatment of the settlings with 60 gallons of hot water is carried out in the same manner except that the water is not siphoned off and the entire mass is cooled and the benzyl esters crystallized out while stirring. The resultant mass containing the crystals is then centrifuged to separate the crystals from the mother liquor and the crystals are tested to make sure that the succinic acid has been completely washed out. The combined wash waters or mother liquors are evaporated to dryness in an open enameled evaporator yielding about 32 to 35 pounds of recovered succinic acid which is sufficiently pure for use in subsequent esterifications.

After removal of succinic acid as above described the crystal mass remaining upon centrifuging consists mainly of a mixture of mono and di-benzyl esters of succinic acid and this mass is melted in a steam jacketed aluminum kettle and then slowly run into a solution of 35 pounds of bi-carbonate of soda dissolved in 50 gallons of water. The undissolved residue consists mainly of dibenzyl succinate which is filtered off and washed. This crude dibenzyl succinate is recrystallized from alcohol. The total amount of crystals thus obtained is 68 to 70 lbs. The resulting product is a white crystalline material, completely soluble in alcohol and melting at about 44 to 45° C. The aqueous mother liquor obtained by filtering the crude dibenzyl succinate is acidified with cold dilute sulphuric acid, and the crude mono-benzyl succinate filtered off.

The crude monobenzyl succinate resulting from the preceding operation is dried by fusion and then recrystallized from an equal volume of a 2 to 1 mixture of toluene-gasoline. This recrystallized product is then dried and subsequently melted in 50 gallons of hot water and then a 30% solution of caustic soda is cautiously added with stirring until the solution is neutral or only slightly acid to azo litmin. This neutralized solution is then decolorized by heating with about 1 pound of good quality decolorizing charcoal (such as the material known to the trade as "Dorco") keeping the temperature at about 70° C. for about a half hour. The solution is then allowed to cool and is left standing in contact with the charcoal for about three days before filtering. The filtered solution is evaporated in an enameled vacuum pan at a temperature not exceeding about 70° C. until it reaches a density of about 26° B. at 50° C. It is then cooled in an aluminum crystallizer to about 20° C. or lower without stirring. The crystals which separate are centrifuged and dried completely in an air dryer and sifted thru a 12 mesh screen. The product resulting from the preceding operation is a white crystalline product, giving a clear or only a faintly turbid solution in 1.3 parts of water and the solution is neutral to litmus and azo litmin and does not deposit crystals on standing and does not become turbid on dilution.

The yield from the quantities specified in this example is about 100 pounds. The mother liquor from the final crystallization is diluted and acidified with sulphuric acid. The mono-benzyl succinate thus obtained is added to the next batch just before crystallizing from the toluene-gasoline mixed solvent.

*Example 2.*—Proceed as in Example 1 substituting a chemically equivalent amount of calcium carbonate or hydrated calcium oxide for the caustic soda solution used for neutralizing the purified monobenzyl succinate, after recrystallization from the toluol-gasoline mixture, and using 200 gallons of water instead of 50 gallons on account of the lower solubility of the calcium monobenzyl succinate.

After decolorizing the neutralized solution as described in the preceding example the filtered solution is evaporated at a temperature not exceeding about 70° C. until it reaches a concentration from which the calcium salt will readily separate without leaving an objectionable amount in the mother liquors.

The crystals are centrifuged and dried and the mother liquor worked over as described in the preceding example.

The final purified product consisting mainly of the calcium salt of pure mono-benzyl succinic acid is a white product of a slight sweet taste soluble in alcohol and giving a clear or only faintly turbid solution in about 15 parts of water at 20°C. and in about 6 parts at 50°C. and is neutral to litmus and azo litmin, and does not deposit crystals on standing nor become turbid on dilution. The calcium salt of the monobenzyl ester of succinic acid obtained in accordance with the present example has even more pronounced anti-spasmodic action under certain circumstances than the product of Example 1 and I believe that this increased anti-spasmodic property is probably due to the calcium content which under some circumstances may make up for any calcium deficiency in the body.

*Example 3.*—Proceed as in Example 2, substituting a chemically equivalent amount of lithium carbonate for the hydrated calcium oxid or calcium carbonate.

*Example 4.*—Substitute a chemically equivalent amount of potassium hydroxide for the hydrated calcium oxide in Example 2.

*Example 5.*—Substitute a chemically equivalent amount of magnesium carbonate for the caustic soda used in neutralizing the purified mono-benzyl succinate in Example 1, using sufficient water to dissolve the magnesium salt thus formed but avoiding an amount of water which would cause an objectionable lowering of the yield.

*Example 6.*—Substitute a chemically equivalent amount of strontium carbonate for the magnesium carbonate in Example 5.

It will be understood that in Examples 3, 4, 5 and 6, the proportions of water used in connection with the neutralization of the purified mono-benzyl succinate must be such as to produce a satisfactory yield of the salt without excessive loss in the mother liquors.

It will be observed that in the esterification step as carried out in accordance with my invention the reaction between benzyl alcohol and succinic acid does not take place in accordance with the following equation:

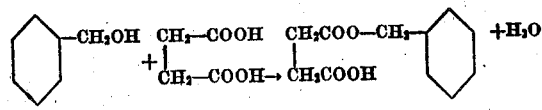

This is the reaction which one would naturally expect to take place. I have discovered that on the contrary the reaction proceeds (approximately at least) in accordance with the equation:

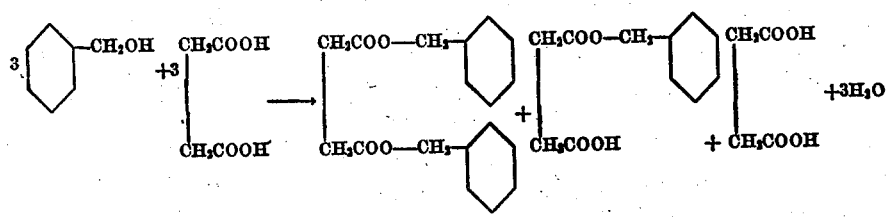

However, I have discovered also that the proportion of mono-benzyl succinate is increased by using an excess of succinic acid. For example, if twice the molecular proportion of succinic acid is used the ratio of mono to di-benzyl ester formed is about 2.5 to 1. If the reaction is carried out with such an excess of succinic acid care must be taken to wash out all the succinic acid remaining in the mixture after esterification, since the amount to be recovered under these circumstances is very much greater than when lesser amounts of succinic acid are used. An important advantage connected with the use of an excess of succinic acid in connection with the procedure just described is that the benzyl alcohol enters completely into the reaction so that purification with the toluol-gasoline mixture is rendered unnecessary.

Furthermore, I have discovered that the mono-benzyl ester can be formed without the production of any objectionable amount of the di-benzyl product by using succinic anhydride in place of succinic acid. When this procedure is followed the succinic anhydride and benzyl alcohol are heated together in equal molecular amounts at about 120° C. for a few hours.

It will be understood also, that my invention (as previously mentioned) includes the monobenzyl esters of other di-basic acids than succinic and particularly of malonic, maleic, fumaric and tartaric acids or of di-basic aliphatic acids and similar acids in general, but I prefer the succinic acid derivative.

In preparing the monobenzyl derivatives of di-basic acids other than succinic, the process which I prefer to use is in general substantially the same as that described in the examples already given in connection with succinic acid but it will be understood of course that various minor changes are to be made in the process under these circumstances according to the particular acid used in accordance with practices and procedures well-known to those skilled in this art.

It will be understood further that my invention is not restricted to soluble salts prepared from ester-acids derived from an acid and benzyl alcohol but includes the corresponding salts prepared from ester-acids derived from an acid and various derivatives of benzyl alcohol which salts may be prepared by the methods outlined in the examples hereinbefore described with certain variations in the procedure which will be obvious to those skilled in this art.

Likewise my invention includes the soluble salts prepared from ester-acids which are derived from benzyl alcohol (or its derivatives) and various derivatives of di-basic acids (or other similar acids) which salts may be prepared according to methods which will be obvious in view of the examples hereinbefore described.

I claim:

1. As a new composition of matter calcium benzyl succinate.

2. As a new composition of matter a non-toxic benzyl succinate of an alkali earth metal.

In testimony whereof I affix my signature.

PAUL SEYDEL.